2 Sheets, Sheet 1.
D. Huffman,
Saw Gummer.
No. 112,711. Patented Mar. 14, 1871.
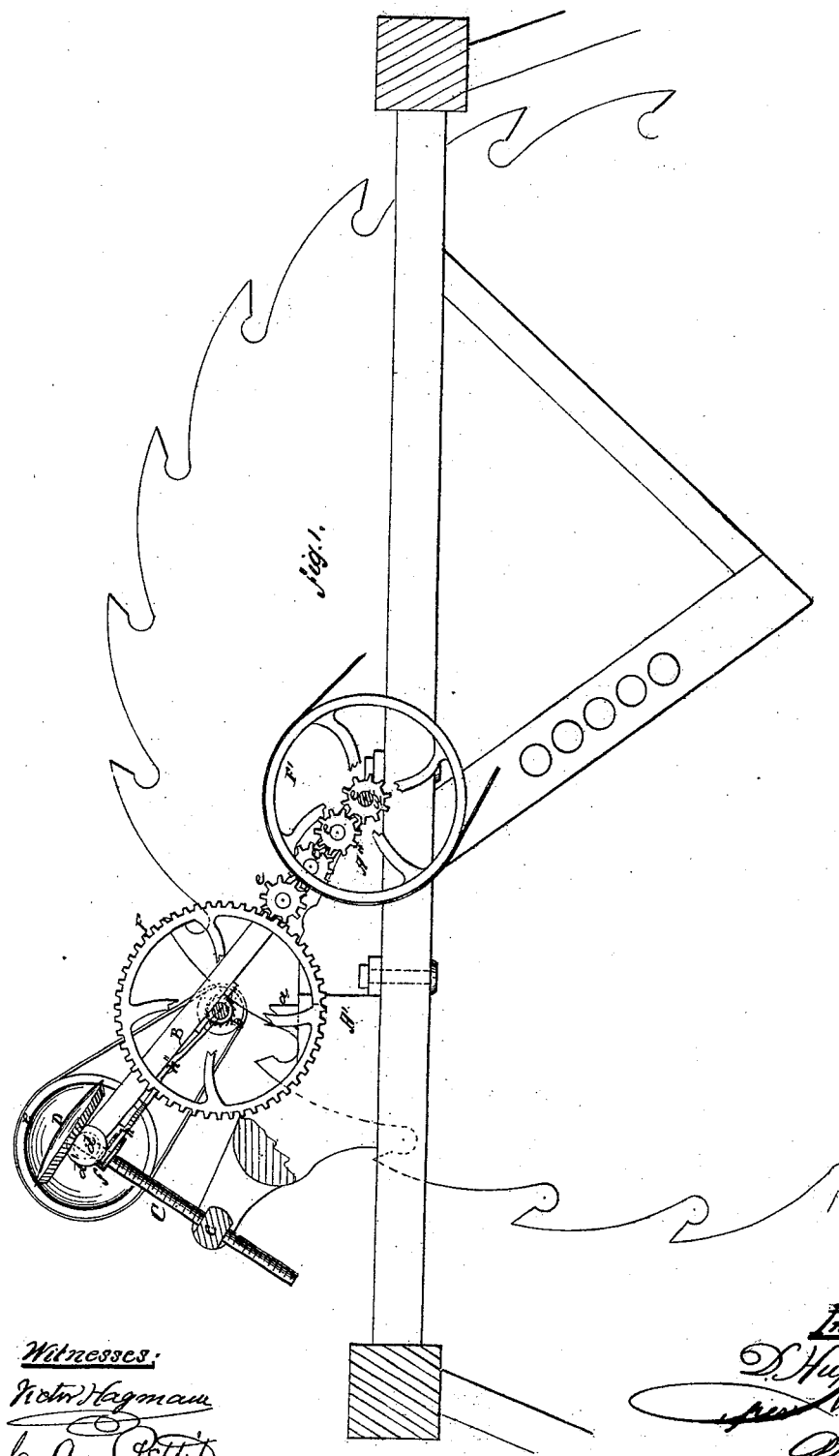
Witnesses:
Inventor:

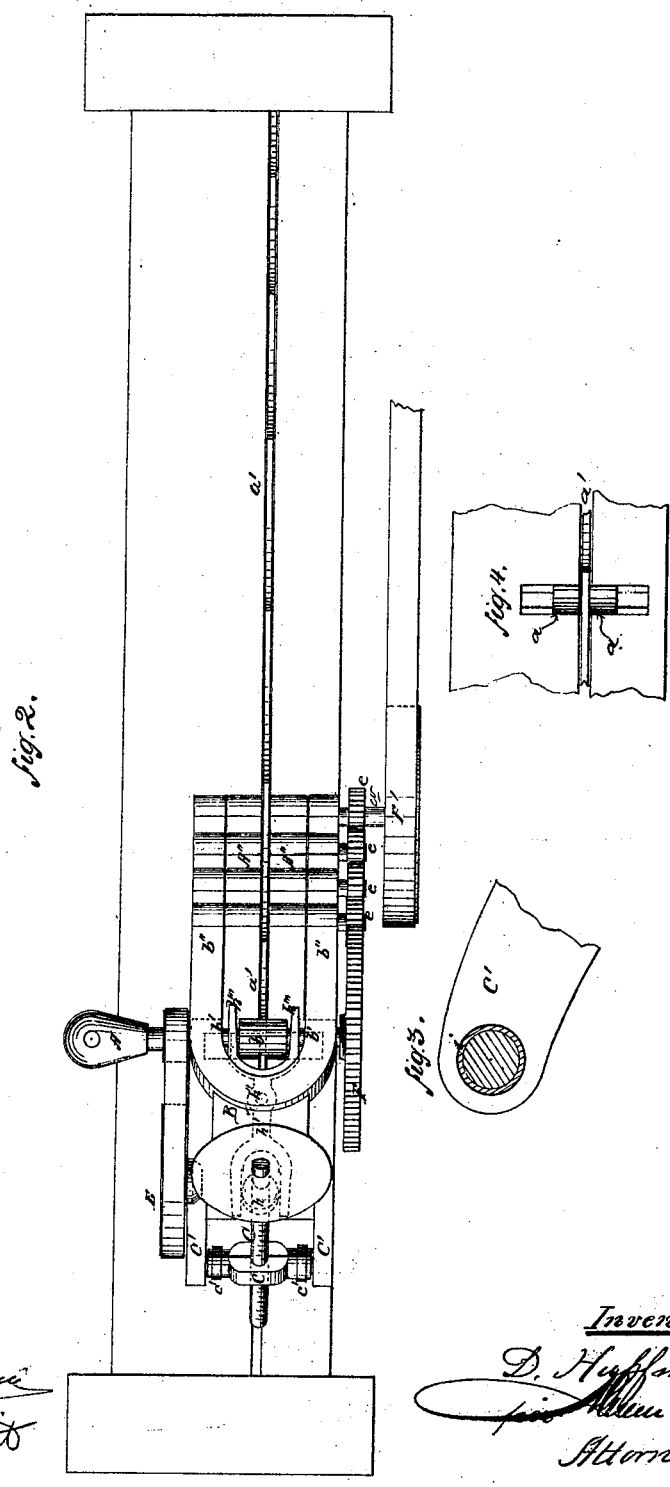
D. Huffman
Saw Gummer.
No. 112,711. Patented Mar. 14, 1871.
2 Sheets Sheet 2.
Witnesses:
Victor Hagman
C. A. Pettit
Inventor:
D. Huffman
per Allen & Co.
Attorneys.

United States Patent Office.

DAVID HUFFMAN, OF LURAY, VIRGINIA.

Letters Patent No. 112,711, dated March 14, 1871.

IMPROVEMENT IN SAW-GUMMERS.

The Schedule referred to in these Letters Patent and making part of the same.

*To all whom it may concern:*

Be it known that I, DAVID HUFFMAN, of Luray, in the county of Page and State of Virginia, have invented a new and improved Machine for Retoothing or Gumming Circular or other Mill-Saws; and I do hereby declare that the following is a full, clear, and exact description of the same, reference being had to the accompanying drawing making a part of this specification.

Nature and Object of the Invention.

The invention consists of devices, too fully described hereafter to need preliminary explanation, whereby the curved backs and throats of saw-teeth may be regularly and speedily formed or re-cut.

Description of the Accompanying Drawing.

Figure 1 is a side view of my improved machine for sharpening or gumming circular saws;

Figure 2, a plan view of the same; and

Figures 3 and 4, detached views of parts of the machine.

General Description.

The frame A' A" is supported upon suitable legs or feet, or otherwise, at a sufficient height above the ground to enable the circular saw X, which may be attached to the said frame, to be turned as its teeth are successively operated upon by the machine. In the present instance the saw is supported by and turns upon a mandrel which is inserted through one of a number of holes, $x$, arranged at different heights in the lower portion of the frame, so as to suit saws of different diameters, and the upper portion of the said saw extends through a narrow slot, $a'$, formed for its reception in the portions A' and A" of the frame.

In order to prevent the saw from turning when being operated upon by the machine, as hereafter explained, it is firmly held by a vise arranged within the portion A' of the frame, on either side of the slot $a'$, in such a manner that its jaws $a$ $a$ can be forced together by horizontal screws.

The vise arranged to clamp the saw, as above described, is similar to that described in my patent of October 27, 1868, for a device for sharpening saws.

The cutting-tool or gummer $b$ is attached to a short spindle, $b'$, hung transversely to a forked arm, B, the branches $b''$ $b''$ of which extend on either side of the saw, and are pivoted by the driving-shaft to the portion A" of the frame, at such points that the cutter, when the said arms are turned upon their pivot, may be caused to travel in the arc of a circle eccentric to the center of the saw, or, in other words, in a curve corresponding to that of the backs of the teeth of the said saw. In order that the length of the radius of the curve described by the cutter may be varied to suit the different sizes of saw-teeth to be operated upon, the arm B is provided, near the extremities of its forked ends, with a number of holes, through any of which the pivoting-shaft or pins may be passed.

The arm B is supported, near its outer end, by a screw-rod, $c$, which passes through and is adapted to the threads of a split nut, $c$, attached to arms $c'$ $c'$ on the frame of the machine, as will be more fully described hereafter; and at the upper end of the said screw-rod there is a bevel-wheel, D, gearing into a smaller wheel, $d$, of a horizontal spindle, $d'$, which is hung to the arm B, and is also provided with a band-wheel, E, through the medium of which and a belt or cord it receives its motion from a small pulley at one end of the cutter-spindle $b'$.

The latter has, at its opposite end, a large cog-wheel, F, which is driven, through the medium of a series of small gear-wheels, $e$, by a driving-pulley, F', the center of which coincides with that of the pivot of the arm B, or with that of the driving-shaft $w$, to which the pulley F' is attached.

It will be seen that, when the point on which the arm B swings is changed, one, or more, of the pinions $e$ is removed, or additional pinions are inserted, so as to maintain the connection between the driving-shaft and the cutter-shaft.

It will be evident that when the cutter $b$ is rotated by the above arrangement of gearing, it will also be caused to descend gradually with the arm B, owing to the motion imparted to the screw-rod $c$ and the consequent descent of the latter through the nut $c$.

The nut $c$ consists of a cross-piece extending between the arms or extensions $c'$ of the frame of the machine, and having at each end trunnions fitted to and arranged to turn in the said extensions, in order that it may adapt itself to the various angles assumed by the screw-rod, as the latter descends with the arm.

The said nut is also split or formed in two sections, detachable from each other, so that the screw-rod, when completely lowered, may be quickly raised with the arm B, without reversing its motion and causing it to travel slowly upward through the nut. When the screw-rod is descending the two sections of the split nut are held firmly together by bands or rings $\bar{c}$, which may be slipped longitudinally toward the trunnions when the sections are to be separated.

The nut is introduced into its place between the arms $c'$ through an opening in one of the latter, which is afterward filled with a bushing, $i$, adapted to receive one of the trunnions of the nut, (see fig. 3.)

In order that the cutter $b$ may be worn away regularly, instead of at the center only, it is arranged to have a longitudinal movement upon its spindle as it is rotated. This motion is imparted it by a lever, $h$, hung to the arm B at the point $h''$, and embracing, with one of its forked ends, a cam, $h$, on the screw-rod, $c$, while its opposite forked end, $h^3$, extends on either side of the cutter.

Operation.

The saw, the teeth of which are to be gummed or re-cut, is attached to the frame of the machine, as before described, and the arm B, carrying the cutter, is pivoted to the frame in such a position that the cutter may be caused to travel in the arc of a circle corresponding to the proper curve of the backs of the teeth of the saw.

The machine having been thus adjusted, the saw is rigidly secured between the jaws $a\ a$ of the vise, to prevent it from turning, and the arm B is raised until the cutter bears against the back of the tooth to be operated upon at the point of the same. The machine is then set in motion, and the cutter begins to operate upon the back of the tooth, it being at the same time carried gradually downward by the action of the screw $c$, until it has entered and re-cut the throat of the succeeding tooth.

The machine is then stopped, and the sections of the split nut $c$ are separated, so as to permit the screw-rod, together with the arm B and its cutter, to be raised to their former positions, after which the pressure of the vise upon the saw is relieved, and the saw is turned to a sufficient extent to permit the next tooth to be brought to the position previously occupied by the tooth which has been cut. The saw is then secured between the jaws of the vise as before, and the above-described operations are repeated, the remaining teeth being successively operated upon in like manner.

The above machine, although intended mainly for operating upon the teeth of circular saws, can, without material alteration, be adapted for mill-saws which have teeth with curved backs.

The machine can be considerably modified without departing from the main features of my invention. For instance, the arrangement of the gearing and of the devices for raising and lowering the pivoted arm and cutter might be different from that described, or the frame of the machine might be differently constructed, or be altogether dispensed with as a support for the saw, where the latter could be operated upon without removing it from its bearings. In this latter case the arm carrying the cutter might be pivoted to the saw itself, or to any attachment thereto, providing only that the said arm be pivoted eccentrically in respect to the center of the saw.

It will be seen that, by suspending the saw in a frame, A, the necessity of removing and readjusting the apparatus after cutting each tooth is avoided, the saw being turned on the mandrel or shaft after each tooth is cut, so as to bring the next into position, where it is held by the vise. By thus suspending the saw the further and more important result of operating the cutter by power, instead of by hand, as heretofore, is effected, for as the frame is stationary, its driving-shaft can be driven, as described, from any adjacent shafting—a result which cannot be obtained when the cutting apparatus must be adjusted on the saw after operating on each tooth.

Claims.

1. The combination of the frame A, its adjustable mandrel on which to suspend a circular saw, and the arm B, carrying a rotating cutter in a curved path eccentric to the center of the saw, said cutter being driven from a shaft, the axis of which coincides with the fulcrum of said arm B.

2. The combination of the frame carrying the arm B and its rotating cutter, and the split nut $c$ and screw-shaft C connected to the arm B, and operated through the medium of devices substantially as described.

3. The arm B carrying the cutter, and having its pivot coinciding with the axis of the driving-shaft, and provided with detachable pulleys $e$ or equivalent devices, whereby the arm may be adjusted without interfering with the operation of the cutter, substantially as described.

4. The combination of the cutter, capable of a limited lateral movement, and the forked lever $h'$ and cam $f$, or their equivalent.

To the above specification of my invention I have signed my hand this 21st day of January, 1870.

DAVID HUFFMAN.

Witnesses:
 GEO. E. BROWN,
 CHAS. A. PETTIT.